United States Patent
Moench et al.

(10) Patent No.: US 10,757,758 B2
(45) Date of Patent: *Aug. 25, 2020

(54) HEATING SYSTEM FOR HEATING A LIVING BEING

(71) Applicant: PHILIPS PHOTONICS GMBH, Ulm (DE)

(72) Inventors: Holger Moench, Eindhoven (NL); Mark Carpaij, Eindhoven (NL)

(73) Assignee: TRUMPF PHOTONIC COMPONENTS GMBH, Ulm (DE)

( * ) Notice: Subject to any disclaimer, the term of this patent is extended or adjusted under 35 U.S.C. 154(b) by 284 days.

This patent is subject to a terminal disclaimer.

(21) Appl. No.: 15/860,744

(22) Filed: Jan. 3, 2018

(65) Prior Publication Data

US 2018/0126821 A1    May 10, 2018

Related U.S. Application Data

(63) Continuation of application No. 14/369,222, filed as application No. PCT/IB2013/050415 on Jan. 17, 2013, now Pat. No. 9,873,308.

(Continued)

(51) Int. Cl.
*H05B 1/00* (2006.01)
*H05B 3/02* (2006.01)
(Continued)

(52) U.S. Cl.
CPC ....... *H05B 1/0236* (2013.01); *B60H 1/00742* (2013.01); *H05B 1/00* (2013.01); *H05B 2203/032* (2013.01)

(58) Field of Classification Search
None
See application file for complete search history.

(56) References Cited

U.S. PATENT DOCUMENTS 5,164,949 A   11/1992 Ackley
5,812,571 A    9/1998 Peters
(Continued)

FOREIGN PATENT DOCUMENTS

CN   1378823 A    11/2002
DE   19753864 A1   6/1998
(Continued)

OTHER PUBLICATIONS

Laser Doppler Flowmetry—A Theoretical Framework 2007 Fredericksson et al p. 12.

(Continued)

*Primary Examiner* — Joseph M Pelham
(74) *Attorney, Agent, or Firm* — Leydig, Voit & Mayer, Ltd.

(57) ABSTRACT

The invention relates to a heating system for heating a living being, for instance, a person (2) within a vehicle (1) being preferentially a hybrid car or an electric car. The heating system comprises an infrared laser system (5, 6) for illuminating the living being with infrared laser light, thereby heating the living being. Thus, heating radiation is used, which has a high collimation and which can be focused relatively easily. The heating can therefore be confined to a certain region, in which the living being is located. The heating can even be confined to the living being or to parts of the living being only. This more focused heating allows for a reduction of the energy consumption.

20 Claims, 4 Drawing Sheets

Related U.S. Application Data

(60) Provisional application No. 61/587,170, filed on Jan. 17, 2012.

(51) Int. Cl.
  *B60H 1/22* (2006.01)
  *H05B 1/02* (2006.01)
  *B60H 1/00* (2006.01)

(56) References Cited

U.S. PATENT DOCUMENTS

| | | | |
|---|---|---|---|
| 6,021,956 A | 2/2000 | Haraguchi | |
| 6,679,830 B2 | 1/2004 | Kolarovic | |
| 6,798,810 B2 | 9/2004 | Albrecht | |
| 7,797,966 B2 | 9/2010 | Pandelisev | |
| 7,949,024 B2 | 5/2011 | Joseph | |
| 8,160,718 B2 | 4/2012 | Khodak | |
| 8,995,493 B2 | 3/2015 | Joseph | |
| 2001/0029416 A1* | 10/2001 | Breed | B60J 10/00 701/45 |
| 2003/0073229 A1 | 4/2003 | Greenstein | |
| 2003/0125855 A1* | 7/2003 | Breed | G06K 9/00832 701/36 |
| 2004/0118555 A1 | 6/2004 | Fristedt | |
| 2005/0131607 A1* | 6/2005 | Breed | B60N 2/002 701/45 |
| 2006/0022213 A1 | 2/2006 | Posamentier | |
| 2006/0089546 A1 | 4/2006 | Mahony | |
| 2006/0092401 A1 | 5/2006 | Troxell | |
| 2006/0280825 A1 | 12/2006 | Cochran | |
| 2007/0096352 A1 | 5/2007 | Cochran | |
| 2008/0046044 A1* | 2/2008 | Jahnigen | A61N 5/06 607/100 |
| 2008/0065291 A1* | 3/2008 | Breed | B60N 2/002 701/36 |
| 2008/0069403 A1* | 3/2008 | Breed | G06K 9/00597 382/104 |
| 2008/0142713 A1 | 6/2008 | Breed | |
| 2008/0168787 A1 | 7/2008 | Kameyama | |
| 2009/0092284 A1* | 4/2009 | Breed | B60J 10/00 382/103 |
| 2009/0287069 A1 | 11/2009 | Naghavi | |
| 2010/0017953 A1 | 1/2010 | O'Keefe | |
| 2010/0176110 A1 | 7/2010 | Ogino | |
| 2010/0187211 A1 | 7/2010 | Eisenhour | |
| 2010/0230863 A1 | 9/2010 | Moench et al. | |
| 2010/0258645 A1 | 10/2010 | Hioki | |
| 2010/0324398 A1 | 12/2010 | Tzyy-Ping | |
| 2011/0002675 A1 | 1/2011 | Cochran | |
| 2011/0002677 A1 | 1/2011 | Cochran | |
| 2011/0042988 A1 | 2/2011 | Alpert | |
| 2011/0060266 A1 | 3/2011 | Streeter | |
| 2011/0067726 A1 | 3/2011 | Cochran | |
| 2011/0071602 A1 | 3/2011 | Irge | |
| 2011/0077809 A1 | 3/2011 | Leary | |
| 2012/0030873 A1 | 2/2012 | Tutzxo | |
| 2012/0239119 A1 | 9/2012 | Vyasarao | |
| 2012/0277545 A1 | 11/2012 | Teixeira | |
| 2013/0066403 A1 | 3/2013 | Giraud et al. | |
| 2014/0195096 A1 | 7/2014 | Schliep | |
| 2014/0301724 A1 | 10/2014 | Graham | |
| 2014/0305919 A1 | 10/2014 | Bellec | |
| 2015/0028114 A1 | 1/2015 | Rosen | |
| 2016/0164261 A1 | 6/2016 | Warren | |

FOREIGN PATENT DOCUMENTS

| | | |
|---|---|---|
| DE | 202004007466 U1 | 4/2005 |
| DE | 1020070158141 A1 | 6/2008 |
| DE | 102008059553 A1 | 6/2010 |
| JP | 2004290499 A | 10/2004 |
| JP | 2010083204 A | 4/2010 |

OTHER PUBLICATIONS

Fanger "Assessment of Man's Thermal Comfort in Practice" British Journal of Industrial Medicine, 1973, p. 313-324.

* cited by examiner

HEATING SYSTEM FOR HEATING A LIVING BEING

CROSS-REFERENCE TO PRIOR APPLICATIONS

This application a continuation of U.S. patent application Ser. No. 14/369,222, filed on Jun. 27, 2014, which is the U.S. National Phase application, under 35 U.S.C. § 371 of International Application No. PCT/IB2013/050415, filed on Jan. 17, 2013, which claims the benefit of U.S. Patent Application No. 61/587,170, filed on Jan. 17, 2012. These applications are hereby incorporated by reference herein

FIELD OF THE INVENTION

The invention relates to a heating system, a heating method and a heating computer program for heating a living being. The invention relates further to a camera system and a driver assist system for cooperating with the heating system.

BACKGROUND OF THE INVENTION

US 2010/0187211 A1 discloses a vehicle cabin heating system. An infrared heater heats a target surface in front of the infrared heater within a vehicle cabin interior space, wherein a temperature sensor disposed in front of the infrared heater detects a temperature. A controller is operatively coupled to the infrared heater, in order to selectively operate the infrared heater to a target surface temperature within the vehicle cabin interior space, whenever an estimated surface temperature of a target surface, which is determined based on the detected temperature, falls below a prescribed temperature range below the target surface temperature. This kind of heating the vehicle cabin consumes much energy.

FIELD OF THE INVENTION

It is an object of the present invention to provide a heating system, a heating method and a heating computer program for heating a living being, which allow reducing the energy consumed for heating the living being. It is a further object of the present invention to provide a camera system and a driver assist system for cooperating with the heating system.

In a first aspect of the present invention a heating system for heating a living beging is presented, wherein the heating system comprises an infrared laser system for illuminating the living being with infrared laser light, thereby heating the living being.

Since the heating system comprises a laser system for illuminating the living being with infrared laser light, heating radiation is used, which has a high collimation and which can be focused relatively easily. The heating can therefore be confined to a certain region, in which the living being is located. The heating can even be confined to the living being or to parts of the living being only. For instance, the heating can be confined to very temperature sensitive parts of a person like the face or the feet of the person. This more focused heating within the vehicle allows for a reduction of the energy consumed by heating the interior of the vehicle.

The living being is preferably a person, wherein the infrared laser system is preferentially adapted such that by heating the person the well being of the person is increased. However, the living being can also be an animal or a plant.

The infrared laser system can comprise one or several infrared lasers. In particular, the infrared laser system can comprise several infrared lasers for illuminating the living being in different directions. Preferentially, the infrared laser system comprises one or several vertical-cavity surface-emitting lasers (VCSELs). VCSELs are relatively compact and small and can easily be arranged at different locations within, for instance, a cabin of a vehicle. For example, several VCSELs can easily be arranged at different locations within a car, in order to illuminate a person from different directions.

The heating system is preferentially adapted to be used for heating a person in a vehicle. The vehicle preferentially comprises a window, wherein the infrared laser system can comprise one or several infrared lasers being adapted to be located next to the window. The infrared laser system can be adapted to heat also the window, in particular, for avoiding condensation on the window. The window is, for instance, a windshield of the vehicle.

For heating the window it can be illuminated with infrared laser light of the infrared laser system. For instance, the infrared laser system can comprise several infrared lasers, wherein some infrared lasers can be controlled to illuminate the window and other infrared lasers can be controlled to illuminate the person. Alternatively, the infrared laser system can be controlled to illuminate the window in a first operational state and to illuminate the person in a second operational state, wherein a user can switch between the two operational states or wherein it can be switched automatically between the two operational states. The infrared laser system can be adapted to couple the infrared laser light into the window which may act as a light guide. Within the window the light is guided by total internal reflection, wherein the total internal reflection may be frustrated by ice or water condensation on the window such that light out-coupling is high at regions where heating is needed. Additionally, parts of the window can be adapted ensure that light is coupled out of the window at desired locations by frustrated total internal reflection. Moreover, the infrared laser system can be adapted to heat the window by using the waste heat of the infrared laser system. For instance, a heat conducting connection can be provided between the window and the infrared laser system for transferring the waste heat from the infrared laser system to the window. This heat conducting connection can be a metal connection. Furthermore, the infrared laser system can comprise a cooling unit for cooling the infrared laser system, wherein the heated exhausted air of the cooling unit of the infrared laser system can be directed to the window for heating the window.

The infrared laser system is preferentially adapted to illuminate the living being with near or far infrared light. Moreover, the infrared laser system can be adapted to provide a 300 W heating.

It is also preferred that the infrared laser system comprises an array, in particular, a line, of infrared lasers. Preferentially, the array of infrared lasers is bonded to a flexible substrate. An array, in particular, a line, of infrared lasers bonded to a flexible substrate can relatively easily be arranged at desired locations within, for example, a cabin of a vehicle. For instance, one or several lines of infrared lasers can be arranged at the borders of a windshield of a vehicle.

The living being is preferentially a person within a vehicle, wherein the vehicle comprises a feet region, in which the feet of the person are to be located, wherein the infrared laser system is adapted to be arranged next to or within the feet region for illuminating the feet of the person with infrared laser light.

In a preferred embodiment, the heating system further comprises a) a presence signal providing unit for providing a presence signal being indicative of whether a living being is present such that the living being is illuminatable by the infrared light from the infrared laser system and b) a control unit for controlling the infrared laser system depending on the presence signal. The presence signal providing unit is preferentially an image providing unit for providing an image of the living being as the presence signal such that the control unit is preferentially adapted to control the infrared laser system depending on the provided image. The image providing unit comprises preferentially a camera system for acquiring an image from the living being. The camera system is preferentially adapted to detect infrared light reflected from the living being for acquiring the image. The camera system comprises, for example, a charge-couple device (CCD) camera or a complementary metal oxide semiconductor (CMOS) camera. The camera can also be a thermal camera.

The presence signal providing unit can also be another unit for providing a presence signal like a motion sensor or a receiving unit for receiving the presence signal, in particular, an image from a camera system, via a wired or wireless data connection and for providing the received presence signal.

It is further preferred that the control unit is adapted to determine whether a living being is present such that the living being can be illuminated by the infrared light from the infrared laser system depending on the presence signal, in particular, depending on the provided image, and to control the infrared laser system to provide the infrared laser light, if the control unit has determined that the living being is present, in particular, located within a vehicle, such that the living being can be illuminated by the infrared light. The heating system can therefore be adapted to heat regions of, for instance, a cabin of a vehicle, to which the infrared laser light is to be directed, only if in these regions a living being is really present. This further reduces the energy consumption.

The presence signal can be further indicative of the location of the living being to be heated, wherein the control unit can be adapted to determine the location of the living being depending on the provided presence signal and to control the infrared laser system to provide the infrared laser light to the determined location of the living being. The infrared laser system can comprise laser optics for dynamically directing the laser light to the location of the living being. The infrared laser light can therefore be directed to the living being, even if the living being moves.

In an embodiment the presence signal providing unit is an image providing unit for providing an image of the living being as the presence signal, wherein the control unit is adapted to detect predefined regions on the living being from the provided image and to control the infrared laser system to provide the infrared laser light to the detected predefined regions. The predefined regions are, for example, most heat sensitive body parts like the face or the hands. The predefined regions can also be bare skin regions, which can be detected in the acquired image. Since not the entire living being is illuminated with infrared laser light, but only certain predefined regions, in particular, predefined highly heat sensitive regions of the living being, the energy consumption can be further reduced.

The control unit can also be adapted to determine a temperature value being indicative of a temperature of the living being from the provided image and to control the infrared laser system depending on the determined temperature value. For instance, the control unit can be adapted to analyze the provided image for detecting a reaction of the skin of a person on the infrared light. In an embodiment, it is detected, for instance, whether blood supply is increased by the radiation. Since the blood supply is related to temperature, the respective blood supply value can be regarded as being a temperature value, which can be used by the control unit to adjust the infrared heat.

It is further preferred that the living being is a driver of a vehicle, wherein the heating system comprises an attention signal providing unit for providing an attention signal, if the driver's attention is to be attracted, and a control unit for controlling the infrared laser system depending on the provided attention signal. For instance, the attention signal providing unit can be a driver assist system like a lane departure system or a pre-collision warning system, wherein the attention signal providing unit can provide an attention signal, if the lane has been departed or a collision is likely to occur. The attention signal providing unit can be such a driver assist system or it can be a receiving unit, which receives a corresponding attention signal from a driver assist system and which provides this received attention signal. The attention signal is preferentially an electrical signal having predefined characteristics or which is provided only through a predefined channel such that the electrical signal can be identified as being an attention signal. Thus, if a dangerous situation has been detected, the attention of the driver can be achieved by directing, for instance, pulses of heat to the driver.

The heating system can further comprise a temperature sensor for sensing an ambient temperature like a temperature within a vehicle, wherein the control unit can be adapted to control the infrared laser system depending on the sensed temperature. The heating system can also comprise an input unit allowing a user to input a desired temperature, wherein the control unit can be adapted to control the infrared laser system depending on the input desired temperature and optionally depending on the measured temperature.

In a further aspect of the present invention a camera system for cooperating with a heating system is presented, wherein the heating system comprises a control unit for controlling the infrared laser system depending on a presence signal, wherein the camera system is adapted to acquire an image of the living being and to send the acquired image as the presence signal to the heating system for allowing the control unit of the heating system to control the infrared laser system of the heating system depending on the acquired image.

In a further aspect of the present invention a driver assist system for cooperating with a heating system is presented, wherein the driver assist system is adapted to detect a dangerous situation, to generate an attention signal, if a dangerous situation has been detected, and to send the attention signal to the heating system, in order to allow the control unit of the heating system to control the infrared laser system of the heating system depending on the attention signal.

In a further aspect of the present invention a vehicle comprising a heating system as defined in claim 1 is presented. The vehicle comprises preferentially an electric motor for driving the vehicle. In an embodiment, the vehicle is a hybrid vehicle or a pure electric vehicle. Preferentially, the heating system comprises several infrared lasers being distributed within the vehicle. The infrared lasers are preferentially distributed over dimensions covering a significant part of the space within the vehicle. The significant part has preferentially a minimum length of 15 cm in at least one direction. The several infrared lasers can be arranged in lines located at the borders of a windshield of the vehicle.

In a further aspect of the present invention a heating method for heating a living being is presented, wherein the heating method comprises illuminating the living being with infrared laser light by an infrared laser system, thereby heating the living being.

In a further aspect of the present invention a heating computer program for heating a living being is presented, wherein the heating computer program comprises program code means for causing a heating system as defined in claim 1 to carry out the heating method as defined in claim 14, when the computer program is run on a computer controlling the heating system.

It shall be understood that the heating system of claim 1, the camera system of claim 10, the driver assist system of claim 11, the vehicle of claim 12, the heating method of claim 14 and the heating computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
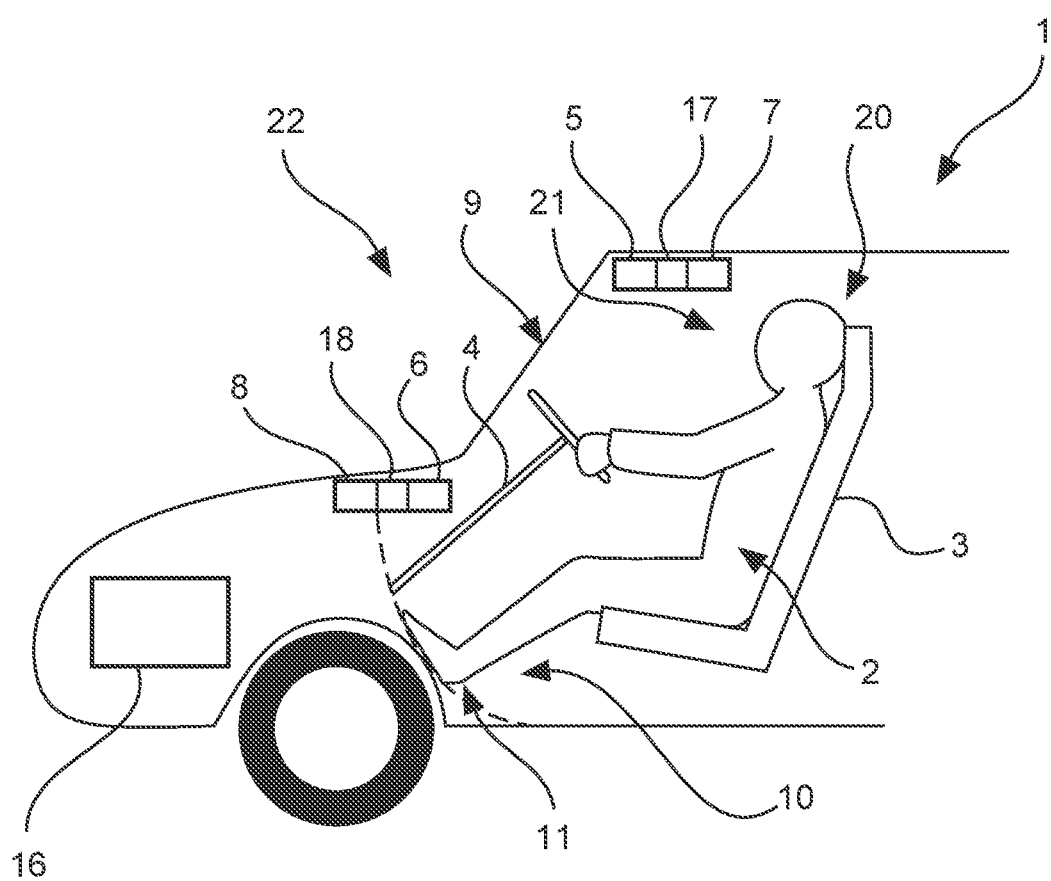
FIG. 1 shows schematically and exemplarily an embodiment of a vehicle.
Figure 2:
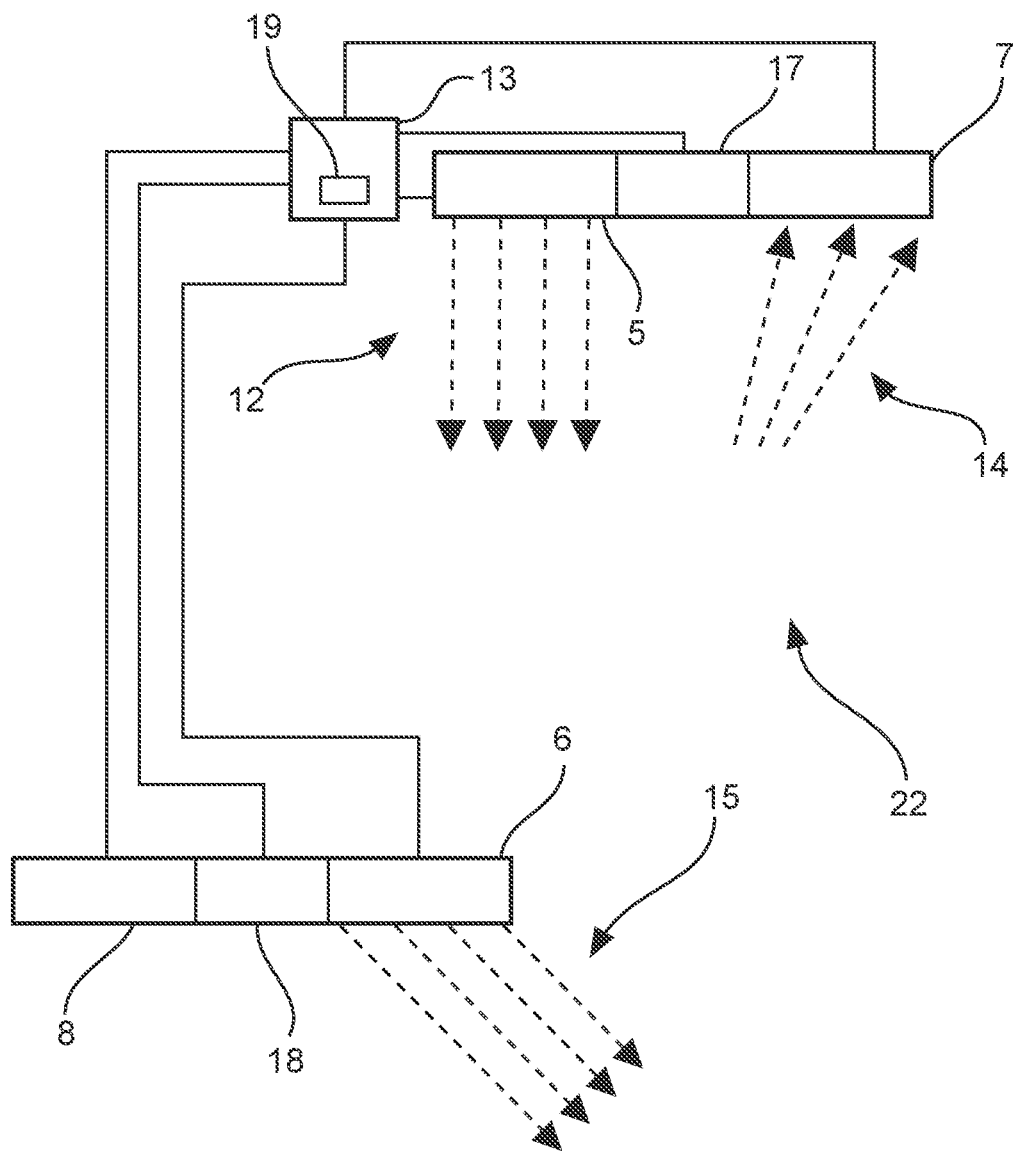
FIG. 2 shows schematically and exemplarily an embodiment of a heating system for heating a living being within the vehicle.

FIG. 1 shows schematically and exemplarily an embodiment of a vehicle 1 comprising a heating system 22 for heating a living being 2 being, in this embodiment, a person within the vehicle 1. The heating system, which is schematically and exemplarily shown in more detail in FIG. 2, comprises an infrared laser system 5, 6 for illuminating the person 2 located within the vehicle 1 with infrared laser light 12, 15, thereby heating the person 2. The vehicle 1 is a hybrid car or an electric car comprising an electric motor 16 for driving the vehicle.

In this embodiment, the infrared laser system comprises two groups 5, 6 of infrared lasers, a first group 5 located close to a head region 21 within the vehicle 1, in which the head 20 of the person 2 is to be located, and a second group 6 close to a feet region 10 within the vehicle 1, in which the feet 11 of the person 2 are to be located.

The two groups 5, 6 of infrared lasers can each be arranged in a line, which may be straight or curved. The several lasers of the groups 5, 6 of the infrared laser system illuminate the person 2 in different directions and are VCSELs.

The first group 5 of lasers is located next to a windshield 9 of the vehicle 1. For instance, it can be arranged next to or at the border of the windshield 9, i.e. directly above, below or at the side of the windshield 9. The first group 5 of lasers can be adapted to illuminate also the windshield 9 with infrared light, in order to avoid condensation on the windshield 9. Moreover, alternatively or in addition the first group 5 of lasers can be adapted to direct waste heat generated by the lasers to the windshield 9, in order to avoid condensation on the windshield 9. Furthermore, a cooling unit of the infrared laser system can produce heated exhausted air, which can be directed to the window for heating the window. The second group 6 of lasers is arranged next to or within the feet region 10 for illuminating the feet 11 of the person 2 with the infrared laser light.

The infrared laser system 5, 6 is adapted to illuminate the person 2 with near infrared light 12, 15 having a wavelength within the wavelength region of, for instance, 850 to 1400 nm. Moreover, the infrared laser system 5, 6 is adapted to provide a heating of about 300 W. In other embodiments, the infrared laser system can also be adapted to illuminate the person 2 with infrared laser light within another wavelength range. For instance, the person 2 can be illuminated with far infrared light. Furthermore, in another embodiment the infrared laser system can be adapted to provide another heating power being larger or smaller than 300 W.

The good collimation of the laser radiation enables the heating system for confined heating of the relevant parts of the person and at the same time allows distributing the laser sources over a wide area. The advantage of distributing the sources over a wide area is twofold: First of all it distributes the waste heat produced in the lasers thus facilitating cooling as well as a secondary use of the waste heat, for example, for heating the window. Secondly it helps significantly to comply with laser safety standards as laser radiation coming from a distributed source causes much less harm as it cannot be refocused on a single point.

The person 2 is a driver sitting on a seat 3 and steering the vehicle 1 by using a steering wheel 4. The heating system 22 comprises a camera system 7 being an image providing unit for providing an image of the person 2, if the person 2 is sitting on the seat 3. The camera system 7 is adapted to detect infrared light 14 reflected from the person 2 for acquiring the image. The camera system 7 comprises, for example, a CCD camera or a CMOS camera. The heating system 22 further comprises a control unit 13, which is schematically and exemplarily shown in FIG. 2. The control unit 13 is adapted to control the infrared laser system 5, 6 depending on the acquired image. In particular, the control unit 13 is adapted to determine whether the person 2 is located within the vehicle 1 such that the person 2 can be illuminated by the infrared light from the infrared laser system 5, 6 depending on the acquired image, i.e. the control unit 13 is adapted to determine whether the person 2 sits on the seat 3. The control unit 13 is further adapted to control the infrared laser system 5, 6 such that the infrared laser light is provided, if the control unit 13 has determined that the person 2 is located within the vehicle 1 such that the person 2 can be illuminated by the infrared laser light. Thus, the illumination with infrared laser light can be switched on or off depending on whether a person is sitting in front of the infrared laser system 5, 6.

In another embodiment this information about whether a person is present within the vehicle or not can also be obtained from another presence signal providing unit like a separate car management system. For instance, the control unit can be adapted to control the infrared laser system to provide the infrared laser light, if the control unit has received a signal from the car management system indicating that a living being is present within the vehicle and can be illuminated by the infrared laser light. For example, the car management system can receive the information whether a person is sitting on a certain seat from, for instance, pressure sensitive sensors incorporated within the respective seat, wherein this information can be provided to the control unit. This pressure sensitive sensor can also be regarded as being a presence signal providing unit.

The control unit 13 is further adapted to detect predefined regions on the person 2 from the acquired image and to control the first group 5 of lasers such that the infrared laser light is provided to the detected predefined regions. The predefined regions are, for example, heat sensitive body parts like the face or the hands. The predefined regions can also be bare skin regions, which can be detected in the acquired image. The infrared laser system preferentially comprises infrared optics for directing the infrared laser light to the detected predefined regions, wherein the infrared optics are controlled by the control unit 13 for directing the laser light to the detected predefined regions. For detecting the predefined regions in the acquired image known image processing techniques, in particular, segmentation techniques like thresholding and comparisons with known shapes of the predefined regions can be used.

The control unit 13 is further adapted to determine a temperature value being indicative of a temperature of the person 2 from the acquired image and to control the infrared laser system depending on the determined temperature value. In this embodiment, the control unit 13 is adapted to analyze the acquired image, in order to detect the reaction of the skin of the person 2 on the infrared light. It is detected whether the blood supply is increased by the infrared radiation, wherein a value can be generated being indicative of the increased blood supply. Since the blood supply is related to temperature, the generated value is a temperature value being indicative of the temperature of the person 2, wherein this temperature value can be used for adjusting the infrared heat applied to the person 2.

For example, the control unit 13 can be adapted to use the software algorithms of the software Vital Signs Camera of the company Philips, which detect small variations in blood flow from an image acquired by a camera. In another embodiment, the control unit and the lasers can be adapted to determine the blood flow by investigating the laser light being scattered back from the skin as disclosed in the article "A Comparative Study for the Assessment on Blood Flow Measurement Using Self-Mixing Laser Speckle Interferometer" by S. K. Ozdemir et al., IEEE Transactions on Instrumentation and Measurement, volume 57, issue 2, pages 353 to 363 (2008), which is herewith incorporated by reference. In particular, a Doppler shift of the scattered light with respect to undisturbed laser light can be determined, wherein the amount of photons having a Doppler shift can be a measure for total blood perfusion. Thus, a reaction of the skin exposed to the infrared light can be detected and the intensity of the infrared laser light can be adjusted accordingly.

The heating system further comprises an attention signal providing unit 8 for providing an attention signal, if the driver's attention should be attracted, wherein the control unit 13 is adapted to control the infrared laser system 5, 6 depending on the provided attention signal. In this embodiment, the attention signal providing unit 8 is driver assist system such as a lane departure system or a pre-collision warning system, which is adapted to provide an attention signal, if the lane has been departed or if a collision could occur. The control unit 13 is preferentially adapted to control the infrared laser system 5, 6 to direct pulses of heat to the driver 2, if it receives an attention signal from the driver assist system 8, in order to attract the attention of the driver 2, if a dangerous situation is detected. The pulses of heat directed to the driver 2 for attracting the driver's attention should of course be sensible by the driver 2, but not damage the driver's skin. The infrared laser system 5, 6 is therefore preferentially operated at a predefined safety level such that the skin is not damaged, i.e. such that the energy level of the heat pulses does not cause too high skin temperatures. In an embodiment, the heat pulses are directed towards the driver with a relatively low frequency between 0.1 to 10 Hz, in order to attract the driver's attention.

The heating system 22 further comprises temperature sensors 17, 18 for measuring the temperature in the head region 21 and the feet region 10, respectively. The measured temperatures are provided to the control unit 13 for allowing the control unit 13 to control the infrared laser system 5, 6 under consideration of the temperature within the cabin of the vehicle. The heating system 22 further comprises an input unit 19, which may be a part of the control unit 13 or which may be a separate unit. The input unit allows a user to input a desired temperature, wherein the control unit 13 is adapted to control the infrared laser system 5, 6 depending on the input desired temperature. In an embodiment, different persons can input different desired temperatures, wherein the control unit 13 is adapted to individually control the infrared laser system 5, 6 such that each person is heated as desired. The control unit 13 can comprise control rules defining characteristics of the infrared laser light like the intensity, the wavelength, the emission direction, et cetera depending on the measured cabin temperature, the desired temperature, an optional further information obtained from, for instance, a camera system and/or a driver assist system.

Figure 3:
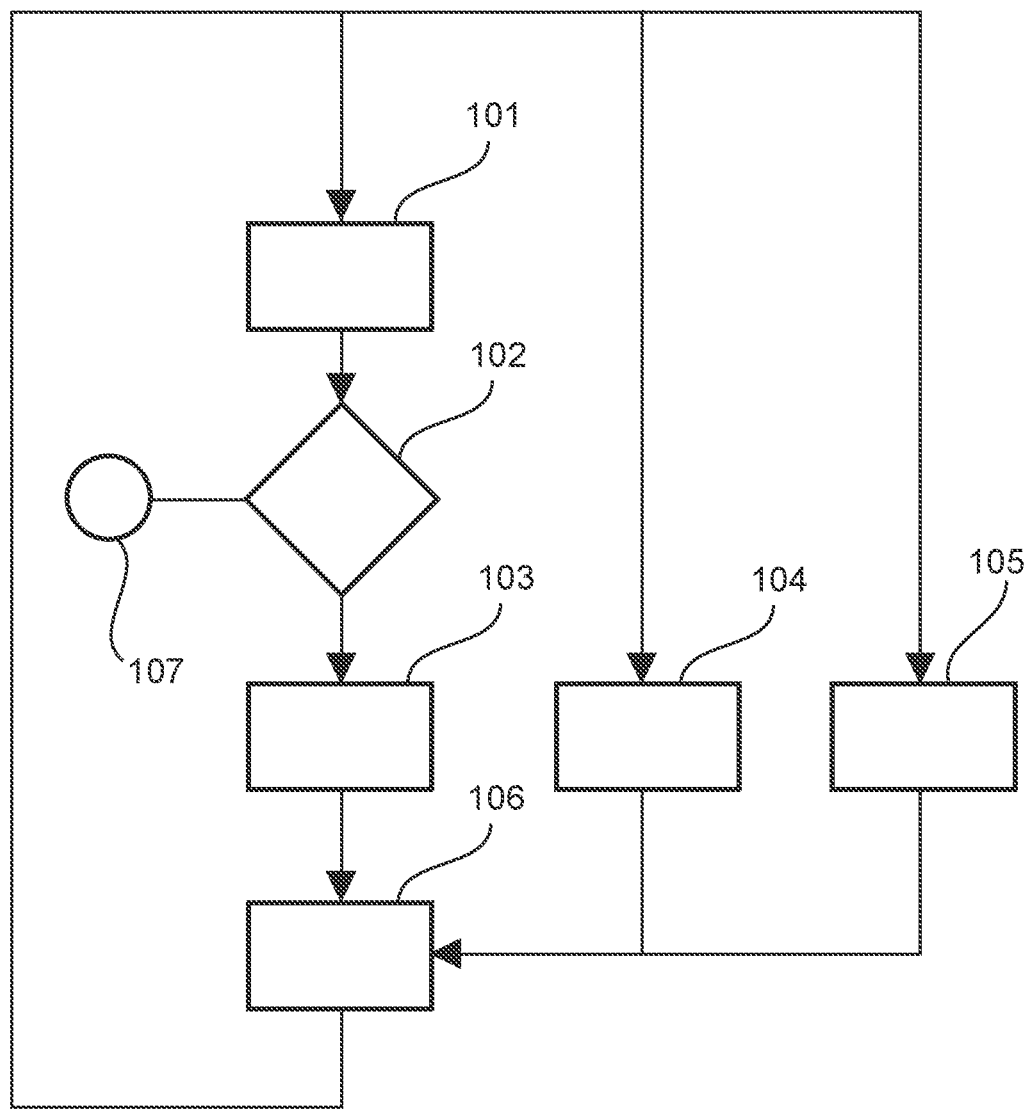
FIG. 3 shows a flowchart exemplarily illustrating an embodiment of a heating method for heating the living being within the vehicle.

In the following an embodiment of a heating method for heating a living being will exemplarily be described with reference to a flowchart shown in FIG. 3.

In step 101, the infrared laser system illuminates the interior of the vehicle and the camera system acquires an image of the interior of the vehicle. In step 102, the control unit determines whether persons are located within the vehicle. In particular, the control unit determines in front of which infrared lasers a person is present. If persons are not present in front of any laser, a heating is not necessary and the heating method ends in step 107. In step 103, the control unit detects predefined regions on the persons from the acquired image. In particular, the control unit detects most heat sensitive body parts like the face or the hands. The predefined regions can also be bare skin regions, which can be detected in the acquired image. Moreover, in step 104 the persons within the vehicle can input desired temperatures via the input unit and in step 105 the temperature sensors measure the temperatures within the cabin of the vehicle. In step 106, the control unit controls the infrared laser system such that only lasers are activated, in front of which really a part of a person is present. Moreover, the control unit controls the infrared laser light emitted by the infrared laser system by using control rules defining characteristics of the infrared laser light depending on the input desired temperature, the measured temperature within the cabin and the locations of the detected predefined regions like the locations of the face and the hands of the person. Steps 101 to 106 can be performed in a loop such that the control of the infrared laser system can be updated, if a new image is acquired by the camera system, if the desired temperature has been modified via the input unit or if the temperature within the cabin measured by the temperature sensors has been changed.

It should be noted that the described heating method is only an exemplary embodiment of a heating method for heating a living being within a vehicle. In other embodiments the heating method can comprise other steps describing the heating of a living being within the vehicle by using infrared laser light of an infrared laser system. For instance, the infrared laser system can be controlled depending on an attention signal of a driver assist system, the acquired image can be used for generating a temperature value, which may be related to an increase of blood supply caused by the infrared radiation, wherein the infrared laser system can be controlled based on the temperature value, the heating method can be stopped after a corresponding input into the input unit by a user, et cetera.

According to the article "Assessment of man's thermal comfort in practice" by P. O. Fanger, British Journal of Industrial Medicine, volume 30, pages 313 to 324 (1973) thermal comfort depends on four factors: a) the temperature of air around the person, b) the air velocity, c) the radiation temperature of the surrounding and d) the clothing. Thermal comfort in modern cars is ensured by automatic climate systems. These systems adjust the air temperature and the air velocity inside the compartment of the car. Since the car body itself is usually around five degrees colder due to strong convective cooling induced by the driving velocity, the air temperature inside the car often needs to be significantly higher than for instance a comfortable air temperature in a house.

Fortunately heat is omnipresent in conventional combustion-engine cars. Only 30 percent of the energy contained in the fuel is transformed into mechanical energy to drive the car. The remaining 70 percent is wasted energy released in the form of heat. It is straightforward to use part of this heat and redirect it into the vehicle's compartment heating up the air.

Electric vehicles have, however, a very good conversion ratio of electrical to mechanical energy. And, as a side effect, heating energy is not abundantly present anymore. Hence systems to heat up the car's compartment need to be electrified as well. Unfortunately these electric heating systems are so energy demanding that the battery is drained quickly, reducing the range of car. In extreme cases the reduction is reported to be 30 percent, which is not acceptable given the limited range of these vehicles.

For solving this problem in known electric cars most heating systems are equipped with a so-called super economic mode. Set in this mode, the climate system reduces its energy demand at the cost of thermal comfort inside the compartment.

The heating system described above with reference to FIGS. 1 and 2 uses infrared laser light, in particular, near infrared laser light, instead of, for instance, hot air, which is often used in climate systems. The feeling of thermal comfort can be realized with less power, wherein the solution is highly directive, i.e. only areas are heated, which really need to be heated, and the effect is instantaneous. The heating system is adapted to directly heat up the persons inside the vehicle. It can be adapted to avoid heating up the air around the passengers, but to still create a comfortable climate, thereby reducing the energy requirement of the heating system to an acceptable level given the limited battery capacity on board.

The heating system preferentially makes use of arrays of lasers. These lasers emit infrared light, which can be conveniently used to heat up the skin of a passenger. In this way heat losses of the passenger can directly be compensated, thus making the person feel comfortable although the compartment's temperature is low. Moreover, the energy can be directed to those body parts where the body's own generated heat is lost the fastest like the face, avoiding a decrease in local skin temperature. Another advantage of the heating system is that the radiative heat creates a comfortable situation instant on, which is especially important for the expected use of electric cars on short distances.

The heating system preferentially uses near infrared radiation provided by VCSELs. VCSELs offer a low cost and efficient source of near infrared laser radiation. Collimated output allows directionality and the small form factor enables integration in the car interior. The heating system preferentially provides a distributed VCSEL solution minimizing safety concerns and allowing an additional use of waste heat rather than requiring specific cooling.

The air temperature can be kept low without losing thermal comfort. For instance, at 300 W per person infrared heat, the air temperature may be 10 degrees lower than currently needed for feeling comfortable. The heating system is preferentially a personalized heating system, where the driver as well as the passenger can personally decide what level of heating they want and experience as comfortable. Thus, to different persons within the vehicle different lasers can be directed, which can be controlled independently from each other by the control unit such that each person can be heated as desired.

The near infrared light of the lasers has a relatively good penetration depth in skin. This has the advantage that the skin is heated in a larger layer, increasing the thermal comfort feeling and avoiding too high skin temperatures.

Several locations in the interior can be considered. In case of two front seats, a mounting of VCSEL arrays directly next to the front windshield is a preferred place. Here, a good opening angle towards the two front passengers is available, and additional heat generated by the lasers can be easily redirected to increase the temperature of the window slightly, thus avoiding condensation. Moreover, the VCSELs are preferentially distributed over a large area. First benefit is that no active cooling is needed as in a more concentrated laser system. Second advantage is that laser radiation coming not from a single opening but from many angles easily fulfils laser safety considerations. Preferred packages are long and flexible lines of many lasers as, for instance, also used for light emitting diodes.

Another preferred mounting position is close to the driver's feet. As these are normally at a well defined position it is easy to direct just a small amount of laser radiation to them. In addition the "frozen" position of the feet makes them especially sensitive to thermal discomfort increasing the value of the laser solution.

Since the heating system is very compact and can easily be integrated in various places, it is also very well suited in the aftermarket for instantaneous heating as provided by a pre-heating of cars.

The laser light is invisible to the human eye. Hence, the laser light is merely perceived as heat and does not disturb vision of the driver and passengers. The heating system described above with reference to FIGS. 1 and 2 provides an advantageous combination with a camera system detecting the position of the passengers, which is an option for future cars also for improved safety. Near infrared light can be detected by standard CCD and CMOS cameras. In combination with a camera the near infrared light of the lasers can be made visible and switched on or off in case a person is sitting in front of the arrays. At the same time in the camera image most heat sensitive body parts can be recognized such as face, bare skin or hands. The light pattern of the lasers can be adjusted such that only these parts are heated. Since the heating system is preferentially instantaneous and lasers offer the unique possibility to change its light and thus heating pattern, the heating system is preferentially used to attract the driver's attention, in particular, depending on a dangerous situation detected by a driver assist system.

Although in the embodiment of the heating system described above with reference to FIGS. 1 and 2 the heating system comprises a camera system and a driver assist system, in other embodiments the heating system may not comprise the camera system or the driver assist system. Moreover, the heating system may be adapted to cooperate with a separate camera system and/or a separate driver assist system, wherein the separate camera system is adapted to acquire an image of the living being and to send the acquired image to the heating system for allowing the control unit of the heating system to control the infrared laser system of the heating system depending on the acquired image and wherein the driver assist system is adapted to detect a dangerous situation, to generate an attention signal, if a dangerous situation has been detected, and to send the attention signal to the heating system, in order to allow the control unit of the heating system to control the infrared laser system of the heating system depending on the attention signal. In this case the image providing unit of the heating system can be a receiving unit for receiving the image from the camera system and for providing the received image to the control unit and the attention signal providing unit can be a receiving unit for receiving the attention signal from the driver assist system and for providing the received attention signal to the control unit of the heating system.

The control unit can be adapted to determine a spatially-dependent temperature value, wherein for different regions of the person visible in the image acquired by the camera system different temperature values can be determined. In this case, the control unit can be adapted to locally control the different lasers of the infrared laser system depending on—inter alia—the spatially-dependent temperature value.

Although in FIG. 1 the first group 5 of infrared lasers is shown only above the windshield 9, in other embodiments the first group 5 of infrared lasers can also be arranged at another location within the vehicle. Moreover, also additional groups of infrared lasers can be arranged within the vehicle. For instance, lines of infrared lasers can be arranged along the upper border, the lower border and/or the lateral borders of the windshield. Also the second group 6 of infrared lasers can be arranged at another location.

Figure 4:
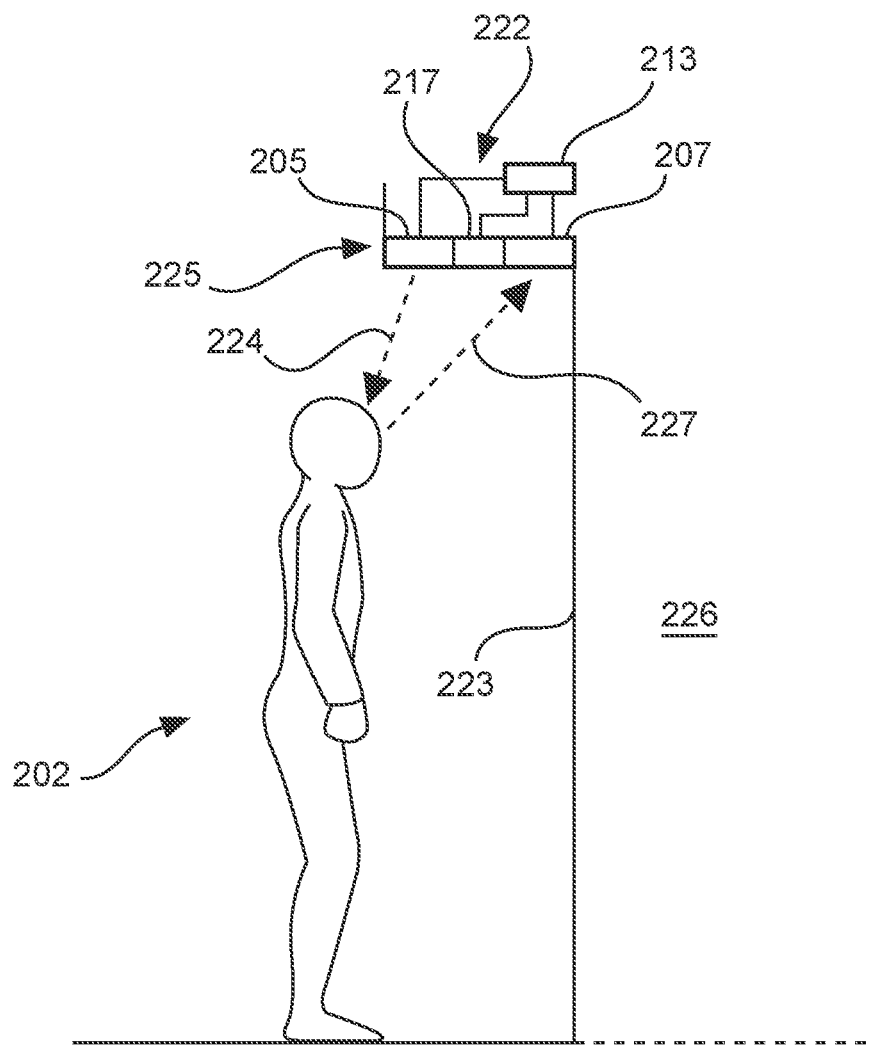
FIG. 4 shows schematically and exemplarily an embodiment of a window display with a heating system for heating a person in front of the window display.

FIG. 4 shows schematically and exemplarily a further embodiment of a heating system for heating a living being. In this embodiment, the heating system 222 is arranged above a display window 223 at or within an overhang 225. However, in other embodiments the heating system can also be arranged at another location. The heating system 222 is adapted to heat a person 202 standing in front of the window display 223. In a space 226 behind the window display 223 objects are located (not shown in FIG. 4) which are displayed. The heating system 222 comprises an infrared laser system 205 being controlled by a control unit 213. Infrared laser light 224 emitted by the infrared laser system 205 is reflected by the person 202, wherein the reflected light 227 is detected by a camera system 207. Moreover, the ambient temperature is measured by a temperature sensor 217. The control unit 213 receives the ambient temperature from the temperature sensor 217 and the image from the camera system 207, in order to allow the control unit 213 to control the infrared laser system 205 depending on the ambient temperature and the acquired image.

The control of the infrared laser system 205 depending on the ambient temperature and the acquired image can be similar to the control of the heating system within the vehicle described above with reference to FIGS. 1 to 3. For instance, also the control unit 213 can be adapted to detect predefined regions on the person like the face or other bare skin regions from the acquired image and to control the infrared laser system 205 to provide the infrared laser light to the detected predefined regions. Alternatively or in addition, also the control unit 213 can be adapted to determine a temperature value being indicative of a temperature of the person 202 from the acquired image and to control the infrared laser system 205 depending on the determined temperature value.

The heating system can be integrated in or around the display window. When a person is detected standing in front of the window, for instance, by the camera system or another presence sensor, the infrared laser system can be switched on, by which heat is instantaneously sent towards the person in front of the window. The directionality of the laser beams can be adjusted by, for example, a lens system, a scanning mirror system, or lasers spread around the window, and directed to heat up the body parts that are typically cold, for example, the face, the hands or any other uncovered body parts. In this way a thermal comfortable situation can be created instantaneously and flexibly. Thermal comfort is expected to be especially increased, since near-infrared radiation penetrates the skin. In this way too high skin temperatures are avoided, while heat loss is still compensated for.

In an embodiment, the heating system is adapted to increase the laser power to a higher level than required for a neutral, i.e. neither cold nor warm, thermal environment. The infrared laser system can also be combined with light emitting diodes for providing further directed illumination. By using the infrared laser system with increased laser power and optionally further direct illumination from light emitting diodes the thermal condition of being exposed to the sun on a sunny day can be mimicked. Direct sunlight with its directed radiation heat is by humans sensed as very pleasing. To mimic the thermal conditions of a sunny day (1000 W/m$^2$), radiation with a power within a range of 10 to 20 W may be directed to the face of a person.

The heating system can also be adapted to be used in another environment. For instance the heating system can be integrated into a bus shelter. It is obviously not economical to provide a thermal neutral environment in a bus shelter by, for example, hot air. The bus shelter is very irregularly occupied in time and by design has an open structure for quick shelter and for people to feel safe. The laser heating system can be adapted to provide the heat instantaneous, avoiding heat up times of conventional heating methods, and to aim its heat directly and optionally only to the cold bodies.

The heating system can also be adapted to be used for, for instance, heating for outdoor sport bench, heating in outdoor areas assigned to smokers, personalized heating in an open fridge or freezer sections of a supermarket, heating person in ski lifts, heating in entrance regions of, for example, big stores et cetera. These situations are similar in that the occupation level is very dynamic, and by design an open, i.e. open to the outdoor, colder environment is required. Therefore heating by conventional means such as hot air is not economical due to the large heat losses to the environment.

It should be noted that the figures are only schematic figures, which are not to scale. For instance, the groups 5, 6 of infrared lasers are, relative to the size of the vehicle, smaller than the corresponding boxes 5, 6 shown in FIG. 1.

Although in the above described embodiments it is assumed that one or several persons are present, wherein the heating system is adapted to heat the one or several persons, in other embodiments the living being can also be an animal or a plant, which needs to be heated. Moreover, although in above described embodiments the vehicle is a car, in other embodiments the vehicle can also be another apparatus for incorporating and moving living beings like a bus, a truck, a ship, a plane, et cetera.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations like the determination whether a person is located in front of a laser array, the detection of predefined regions of the person, the determination of a temperature value based on an acquired image, et cetera performed by one or several units or devices can be performed by any other number of units or devices. For example, steps 101 and 103 can be performed by a single unit or by any other number of different units. The operations and/or the control of the heating system in accordance with the heating method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A heating system, comprising:
   an infrared laser system including one or more infrared lasers disposed in a vehicle, the one or more infrared lasers emitting infrared laser light,
   wherein the one or more infrared lasers are arranged to illuminate and heat a living being disposed within the vehicle,
   wherein the illuminating of the living being with the infrared laser light is confined to a location of the living being by a collimation of the infrared laser light; and
   a control unit arranged to control the infrared laser system in response to a presence signal indicating the presence of the living being within the vehicle such that the living being is illuminatable by the infrared laser light,
   wherein an image is produced from the infrared laser light reflected from the living being,
   wherein the heating system is arranged to detect predefined regions of the living being from the image by performing comparisons of the image with known shapes of the predefined regions, and to direct the infrared laser light to the predefined regions of the living being which are detected from the image.

2. The heating system of claim 1, wherein the infrared laser system comprises one or more vertical-cavity surface-emitting lasers.

3. The heating system of claim 1,
   wherein the one or more lasers include a plurality of vertical-cavity surface-emitting lasers,
   wherein the plurality of vertical-cavity surface-emitting lasers are arranged to illuminate the living being.

4. The heating system of claim 1, further comprising:
   a presence signal providing unit for providing the presence signal,
   wherein the presence signal is indicative of whether the living being is present such that the living being is illuminatable by the infrared light from the infrared laser system,
   wherein the presence signal providing unit comprises a camera arranged to detect the infrared light reflected from the living being in response to the infrared laser light and to provide the image from the detected infrared light.

5. The heating system of claim 1,
   wherein the vehicle comprises a window,
   wherein at least one of the infrared lasers is arranged to illuminate the window.

6. The heating system of claim 5, wherein the at least one infrared laser is arranged to switch, in response to a user control, between illuminating the window and illuminating the living being.

7. The heating system of claim 1, wherein the living being is a driver of the vehicle,
   wherein the heating system comprises an attention signal providing unit for providing an attention signal,
   wherein the control unit further controls the one or more infrared lasers depending on the provided attention signal.

8. A driver assist system for cooperating with the heating system of claim 7, wherein the driver assist system is arranged to
   detect a dangerous driving situation,
   generate the attention signal, if a dangerous driving situation has been detected, and
   send the attention signal to the heating system, in order to allow the control unit of the heating system to control the infrared laser system of the heating system depending on the presence of the attention signal.

9. The heating system of claim 1, wherein the vehicle includes a window, the heating unit further comprising:
   a cooling unit arranged to cool the one or more infrared lasers, wherein heated exhausted air of the cooling unit is directed to the window.

10. The heating system of claim 1, wherein the predefined regions comprise bare skin regions of the living being.

11. The heating system of claim 1, wherein the predefined regions include a face and hands of the living being.

12. A method, comprising:
   illuminating a living being with infrared laser light produced by an infrared laser system, wherein the illuminating of the living being is confined to a location of the living being by collimation of the infrared laser light;
   detecting variations in the blood flow in the living being from a Doppler shift in scattered light from skin of the living being compared to the infrared laser light emitted by the infrared laser system; and
   controlling the infrared laser system to heat one or more portions of the living being in response to the detected variations in the blood flow.

13. The method of claim 12, wherein the infrared laser system is disposed in a vehicle which includes a window, the method further comprising illuminating the window with the infrared laser system so as to heat the window.

14. The method of claim 12, wherein the infrared laser system is disposed in a vehicle which includes a window, the method further comprising:
 illuminating the living being with the infrared laser system when the infrared laser system is in a first operational state; and
 illuminating the window with the infrared laser system so as to heat the window when the infrared laser system is in a second operational state,
 wherein the infrared laser system automatically switches between the first operational state and the second operational state.

15. The method of claim 12, wherein the infrared laser system is disposed in a vehicle which includes a window, the method further comprising:
 coupling at least some of the infrared laser light from the infrared laser system into the window;
 the infrared light propagating within the window by total internal refection; and
 coupling the infrared light out of the window at defined locations.

16. A method, comprising:
 illuminating a living being with infrared laser light produced by an infrared laser system, wherein the illuminating of the living being is confined to a location of the living being by collimation of the infrared laser light;
 acquiring an image from the detected infrared light reflected from the living being;
 detecting predefined regions of the living being from the image by performing comparisons of the image with known shapes of the predefined regions; and
 directing the infrared laser light to the predefined regions of the living being which are detected from the image.

17. The method of claim 16, wherein the predefined regions comprise bare skin regions of the living being.

18. The method of claim 16, wherein the predefined regions include a face and hands of the living being.

19. The method of claim 16, wherein the infrared laser system is disposed in a vehicle which includes a window, the method further comprising:
 illuminating the living being with the infrared laser system when the infrared laser system is in a first operational state; and
 illuminating the window with the infrared laser system so as to heat the window when the infrared laser system is in a second operational state,
 wherein the infrared laser system automatically switches between the first operational state and the second operational state.

20. A heating system, comprising:
 an infrared laser system including one or more infrared lasers disposed in a vehicle, the one or more infrared lasers emitting infrared laser light,
  wherein the one or more infrared lasers are arranged to illuminate and heat a living being disposed within the vehicle,
  wherein the illuminating of the living being with the infrared laser light is confined to a location of the living being by a collimation of the infrared laser light; and
 a control unit arranged to control the infrared laser system in response to a presence signal indicating the presence of the living being within the vehicle such that the living being is illuminatable by the infrared laser light from the one or more infrared lasers,
 wherein the presence signal is generated in response to an image produced from infrared laser light reflected from the living being in response to the infrared laser light.

* * * * *